United States Patent [19]

Shimada et al.

[11] Patent Number: 4,605,569
[45] Date of Patent: Aug. 12, 1986

[54] METHOD AND APPARATUS FOR PANEL WIPING OPERATION

[75] Inventors: Yoshitaka Shimada, Yokohama; Kimihiro Kadowaki, Musashimurayama; Teruo Inouchi, Izumiotsu, all of Japan

[73] Assignees: Nissan Motor Co., Ltd., Yokohama; Sunrise Meisei Corporation, Sakai, both of Japan

[21] Appl. No.: 553,995

[22] Filed: Nov. 21, 1983

[30] Foreign Application Priority Data

Nov. 25, 1982 [JP] Japan .................. 57-205385
Nov. 25, 1982 [JP] Japan .................. 57-205386
Nov. 25, 1982 [JP] Japan .................. 57-206602

[51] Int. Cl.⁴ .............. B05D 5/00; B05D 1/28; B05C 11/00; B25J 9/00
[52] U.S. Cl. .............. 427/256; 118/203; 118/266; 118/681; 118/683; 118/697; 118/211; 427/284; 427/287; 427/299; 427/327; 901/41
[58] Field of Search .......... 118/697, 266, 681, 683, 118/203, 211; 427/284, 256, 287, 299, 327; 901/41, 43

[56] References Cited

U.S. PATENT DOCUMENTS 4,378,959 4/1983 Susnjara .............. 901/43 X

FOREIGN PATENT DOCUMENTS 2346582 3/1975 Fed. Rep. of Germany ........ 901/41

OTHER PUBLICATIONS

Ziebart, E., "Industrieroboter", vol. 72 (1982) Dez., No. 12.

Primary Examiner—Evan K. Lawrence
Attorney, Agent, or Firm—Schwartz, Jeffery, Schwaab, Mack, Blumenthal & Evans

[57] ABSTRACT

A method and apparatus for performing repetitive cycles of panel coating operations using a programmable manipulator including a manipulator arm movable along a plurality of axes. The apparatus comprises a hand unit carried on the manipulator arm. The hand unit is movable so as to bring the brush held by it into resilient contact with an area of the panel to be coated. A coating material is injected into the brush at a predetermined rate while the brush is held in resilient sliding contact with the panel and while the manipulator arm moves about the panel to coat a preselected area of the panel. After the preselected area of the panel has been coated, the manipulator arm is moved to move the brush out of contact with the panel. Between coating cycles, the manipulator arm moves the brush into a storage chamber where it is treated to prevent the coating material from caking on the coating brush.

16 Claims, 11 Drawing Figures

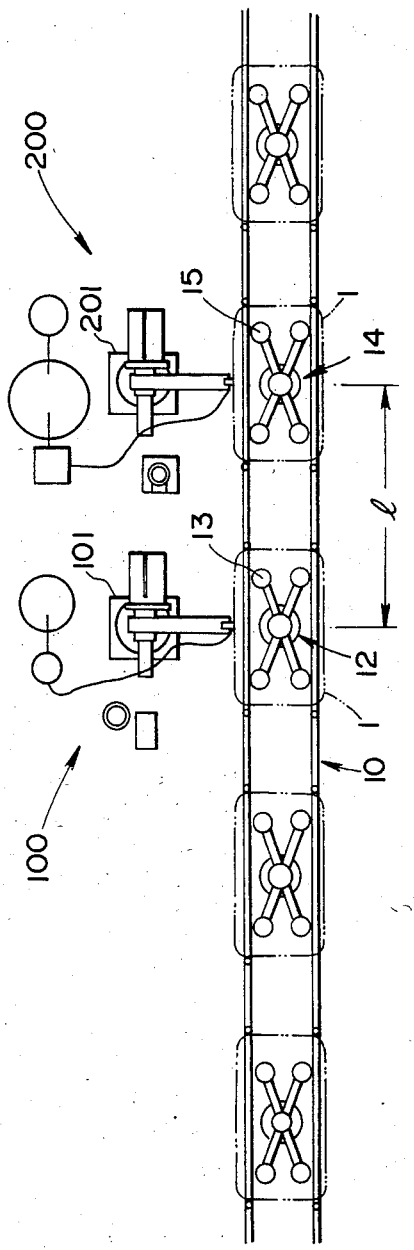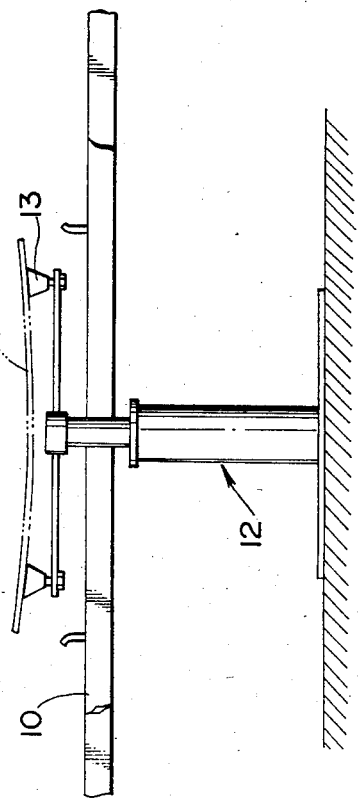

METHOD AND APPARATUS FOR PANEL WIPING OPERATION

BACKGROUND OF THE INVENTION

This invention relates to a method and apparatus for performing repetitive cycles of panel wiping operation using a programmable manipulator including a manipulator arm movable along a plurality of axes and control means for controlling movement of the manipulator arm as programmed during an initial teaching operation. It will be appreciated that the term "panel" as used throughout this invention should be taken to includes panels made of any suitable material such as glass, steel, plastic, or the like.

Generally, an automobile window glass panel is attached to a vehicle body by an adhesive coated on a connection area along the periphery of the window glass panel which is to be fixed to the vehicle body. In order to provide good appearance to the connection area of the window glass panel, it is the conventional practice to apply black print on the periphery of the window glass panel prior to primer coating and adhesive coating processes. However, such black print application is comparatively very costly. During efforts to eliminate the need for costly black print application in the window glass panel fitting process, the inventors have found that over a period of time, the adhesive interface disintegrates and finger marks come into sight in the presence of stains and grease from the hands on the connection area of the window glass panel. Although the window glass panel fitting station is kept clean as compared to other vehicle assembly stations, window glass panels would be stained with dust and grease from handling during storage and transport to the yard.

Therefore, the present invention provides a panel wiping method and apparatus which can eliminate the need for costly black print application and can automate a series of adhesive coating processes so as to improve manufacturing and assembly efficiency and reduce costs through the use of a programmable manipulator apparatus.

SUMMARY OF THE INVENTION

There is provided, in accordance with the present invention, a method and apparatus for performing repetitive cycles of panel wiping operation prior to an adhesive coating process, using a programmable manipulator including a manipulator arm movable along a plurality of axes and control means for controlling movement of the manipulator arm as programmed during an initial teaching operation. The apparatus comprises a hand unit carried on the manipulator arm for movement in unison therewith. The hand unit is movable between chip retain position and a chip release position. A chip supplier supplies a wiping chip to the hand unit for each cycle of panel wiping operation. An actuator moves the hand unit to the chip retain position to hold the supplied wiping chip with the hand unit in response to the supply of the wiping chip to the hand unit. The actuator moves the hand unit to the chip release position upon completion of one cycle of panel wiping operation. The control means includes means for controlling movement of the manipulator arm to slide the wiping chip on an area of a panel which requires wiping in response to the hand unit holding the wiping chip.

Preferably, the chip supplier comprises feeding means for feeding wiping material from a supply roll and cutting means for cutting the wiping material at a predetermined length into a wiping chip. The cutting means includes a sensor for generating a signal when a predetermined length of wiping material is fed from the supply roll. The feeding means is responsive to the signal from the sensor for stopping the feed of the wiping material from the supply roll. The actuator moves the hand unit to the chip retain position to hold the wiping material with the hand unit in response to the signal from the sensor. The cutting means includes a cutter for cutting the wiping material in response to the hand unit holding the wiping material.

After the panel has been cleaned in the wiping operation, it is returned to a conveyor which then conveys it to a primer coating station. When the panel arrives at a predetermined position, a mechanism (not shown) activates a lifting mechanism to lift the panel from the conveyor. The primer coating station comprises a programmable manipulator with a manipulator arm movable along a plurality of axes, and said arm has means for holding a coating brush. The manipulator is programmed to move the manipulator arm into a position where the coating brush comes into resilient contact with an area of the panel to be coated. While the brush is in contact with the panel, a coating material is injected into the brush at a predetermined rate and the brush is held in resilient sliding contact with the panel, while the manipulator arm moves the brush about the panel to coat a preselected area of the panel. After the preselected area has been coated, the manipulator arm is moved so as to move the brush out of contact with the panel and to move it into a storage chamber where it is treated to prevent the coating material from caking on the brush.

BRIEF DESCRIPTION OF THE DRAWINGS

Embodiments of the apparatus of the invention, and method of operation thereof will now be described by reference to the following specification taken in connection with the accompanying drawings.

For a better understanding of the invention, frequent reference will be made to the drawings wherein:

FIG. 1 is a schematic plan view showing a conveyor carrying a series of window glass panels past a glass wiping station and a primer coating station;

FIG. 2 is a schematic elevational view showing the lifter in a panel lifting position;

DETAILED DESCRIPTION OF THE INVENTION

Figure 3:
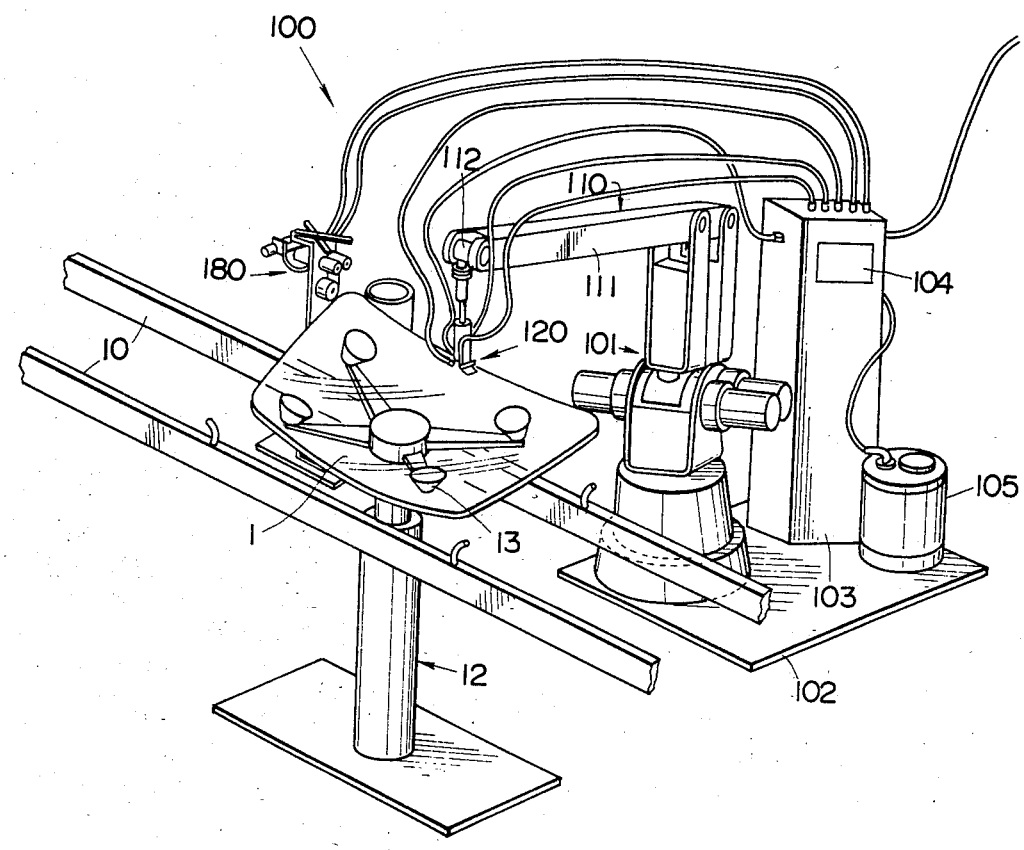
FIG. 3 is a schematic perspective view showing the glass wiping station.

Referring now to FIGS. 1 and 2 of the drawings, there is illustrated a conveyor line 10 which carries a series of window glass panels 1 past a glass wiping station indicated generally at 100 and then past a primer coating station indicated generally at 200 to the following adhesive coating station. The conveyor 10 may comprise a pair of plain shuttle bars arranged in spaced-parallel relation to each other. The window glass panels 1 are accurately positioned relative to the conveyor 10 by any suitable positioning arrangement.

Upon arrival of one window glass panel 1 at the glass wiping station 100, a lifter 12, which supports the window glass panel with four suction cups 13, is actuated to lift the window glass panel off the conveyor 10 to a predetermined position at which a glass wiping manipulator arm wipes a connection area along the periphery of the window glass panel which is to be fixed to the vehicle body so as to remove stains and grease therefrom. While the lifter 12 lifts the window glass panel off the conveyor 10, the conveyor moves by a predetermined distance l in the rearward direction and waits for the following window glass panel to be placed on the conveyor 10.

Upon completion of the glass wiping process for the window glass panel, the lifter 12 lowers the window glass panel 1 down onto the conveyor 10. Thereafter, the conveyor 10 moves by the predetermined distance l in the forward direction to carry the wiped window glass panel to the primer coating station 200 and carry the following window glass panel 1 to the glass wiping section 100.

Upon arrival of the window glass panel 1 at the primer coating station 200, a lifter 14, which supports the window glass panel with four suction cups 15, is actuated to lift the window glass panel of the conveyor 10 to a predetermined position at which a primer coating manipulator arm 210 coats a primer onto the connection area of the window glass panel. Upon completion of the primer coating process, the lifter 14 lowers the window glass panel 1 down onto the conveyor 10. Thereafter, the conveyor 10 moves by the predetermined distance in the forward direction to carry the primer-coated window glass panel to the adhesive coating station.

Referring to FIG. 3, there is illustrated a programmed manipulator apparatus 101 located near the lifter 12 at the glass wiping station 100. The manipulator apparatus comprises a generally rectangular base or mounting platform 102 on which the hydraulically powered manipulator arm 110 of the apparatus is supported together with the hydraulic, pneumatic, electrical and electronic components necessary to perform repetitive cycles of glass wiping operation of the manipulator arm.

Specifically, the base 102 supports a control cabinet 103 within which is housed the electronic control system portion of the manipulator apparatus. The cabinet has a control panel 104 on which are located the various controls of the control system necessary to control movement of the hydraulically powered manipulator arm in both an initial so-called teaching mode and in a repeat mode in which the manipulator arm is moved and in repetitive cycles through a sequence of movements as programmed during the teaching operation. The base 102 also supports a detergent tank 105 which contains ethyl acetate or any other suitable detergent. A detergent delivery pump (not shown) is housed in the control cabinet 103 for supplying the detergent at a predetermined rate from the detergent tank 105. The reference numeral 180 generally designates a wiping chip supply device located near the manipulator apparatus 101.

The hydraulically powered manipulator arm 110 comprises a boom assembly 111 mounted for movement about a plurality of axes relative to the base 102. The boom assembly carries a downwardly projecting hand portion 112 to which is connected a pneumatically operated hand assembly 120 adapted to grasp a wiping chip.

Figure 4:
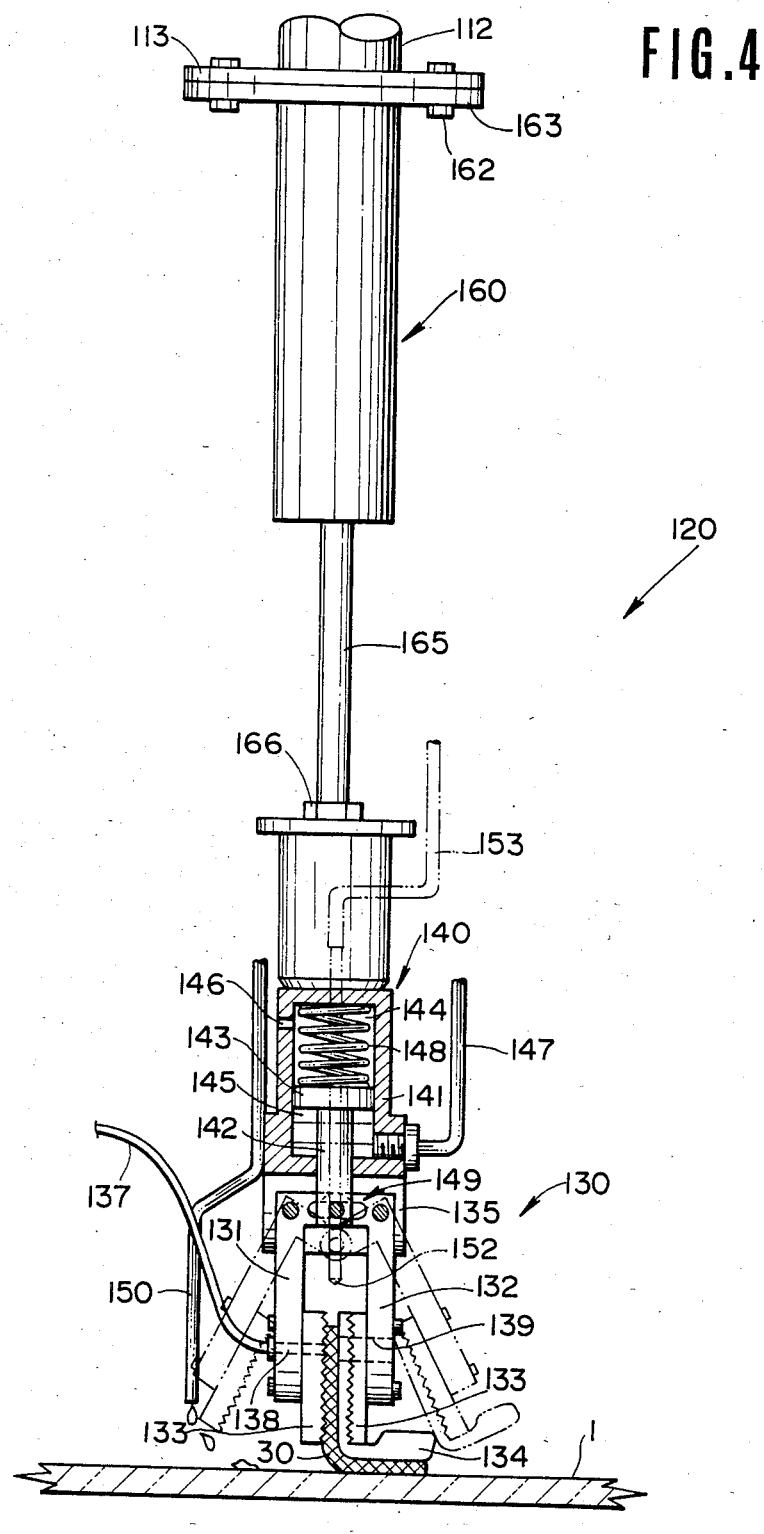
FIG. 4 is an enlarged elevation partly in section showing the detail of the hand assembly of FIG. 3.

Referring to FIG. 4, the pneumatically operated hand assembly 120 is shown in detail as comprising a clamping device 130 which has opposed grasping fingers 131 and 132 arranged to support a wiping chip 30 therebetween. Each of the grasping fingers 131 and 132 has on its inner surface an antiskid member 133 bolted thereto which member 133 is formed on its inner surface with a nonskid pattern such as grooves to provide a large resistance for preventing the wiping chip from slipping out. A substantially L-shaped back-up member 134 is secured to one of the antiskid members 133 to maintain the wiping chip 30 in contact with the window glass panel 1 during the wiping operation. The back-up member 134 may be a resilient pad or brush formed in a desired shape. The grasping fingers 131 and 132 are mounted on a base member 135 for pivotal movement between an opened position indicated by phantom lines and a closed position indicated by solid lines.

In order to detect the presence of a wiping chip 30 between the grasping fingers 131 and 132, a chip sensor is provided which comprises an optical fiber 137 connected to the control system. The optical fiber 137 has its free end placed in a hole 138 formed through the grasping finger 131 and the antiskid member 133. Another hole 139 is formed through the grasping finger 132 and the antiskid member 133, the hole 139 being axially aligned with the hole 138 at the closed position of the grasping fingers 131 and 132. The chip sensor provides an "on" signal to the control system when a wiping chip is held between the grasping fingers which interrupt light from the hole 139 to the hole 138.

The hand assembly 120 also comprises a pneumatically operated actuator generally designated at 140. The actuator 140 includes a cylinder 141 and a plunger 142. The plunger has a head 143 which is adapted to reciprocate within the bore of the cylinder 141. The plunger head 143 divides the cylinder bore into upper and lower chambers 144 and 145, the upper chamber 144 opening to the atmosphere through a vent 146. The lower chamber 145 is connected through an air supply conduit 147 to an air pressure source housed in the control cabinet 103 (FIG. 3). The air pressure source is connected or disconnected from the lower chamber 145 by a solenoid valve 170 on command from the control system (See FIGS. 5 and 6). A return spring 148 is placed in the upper chamber 144 to resiliently urge the plunger 142 downward. The plunger 142 is drivingly connected through a link mechanism 149 to the grasping fingers 131 and 132 so that the extension and retraction movement of the plunger 142 causes the grasping fingers to open and close. When the pressure in the lower chamber 145 overcomes the resilient force of the return spring 148, the plunger 142 moves upward, in the drawing, to move the grasping fingers 131 and 132 to the closed position, as indicated by solid lines. The base member 135 is shown as secured on the lower surface of the actuator cylinder 141.

A detergent conduit 150, which is shown as secured on the side surface of the actuator cylinder 141, has its outlet opening directed towards the window glass plate 1 just in advance of the wiping chip 30 in the direction of sliding movement of the wiping chip. The detergent conduit 150 communicates with the detergent tank 105 (FIG. 3) which contains a detergent or cleaner such, for example, as ethyl acetate. A pump (not shown) is housed in the control cabinet 103 to supply in the form of tiny droplets a predetermined amount of detergent onto the window glass plate from the detergent conduit outlet opening. Although the detergent conduit outlet opening is positioned to supply the detergent in the form of tiny droplets directly onto an area of the window glass plate which requires wiping, it is to be understood that the detergent conduit 150 may extend to the back-up member 134 or the wiping chip so that the detergent can be impregnated into the wiping chip.

The reference numeral 152 designates an air nozzle mounted below the actuator cylinder 141. The air nozzle 152 has an outlet opening directed downward toward the wiping chip 30 held between the grasping fingers 131 and 132. The air nozzle 152 is connected through an air supply conduit 153 to the solenoid valve 170 and hence through the air supply conduit to the actuator lower chamber 145.

Figure 5:
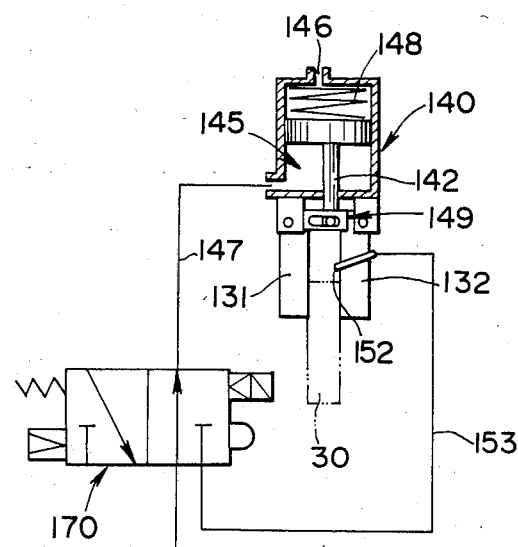
FIGS. 5 and 6 are schematic diagrams used in explaining the operation of the hand assembly of FIG. 4.
Figure 6:
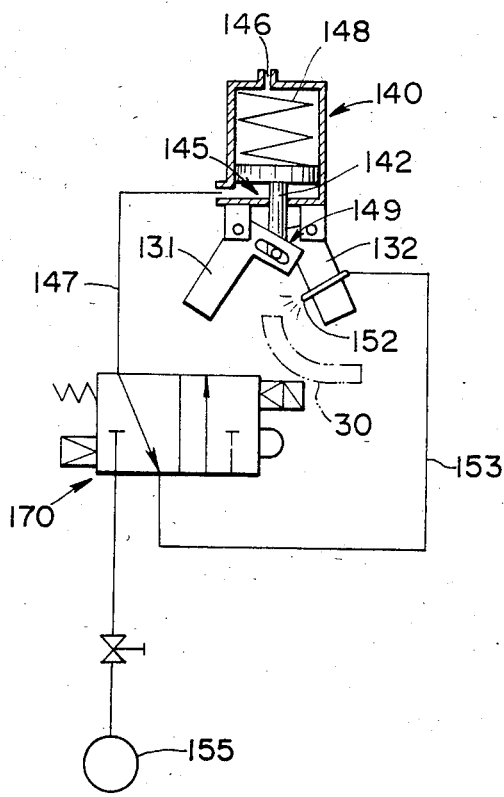
Figure 7:
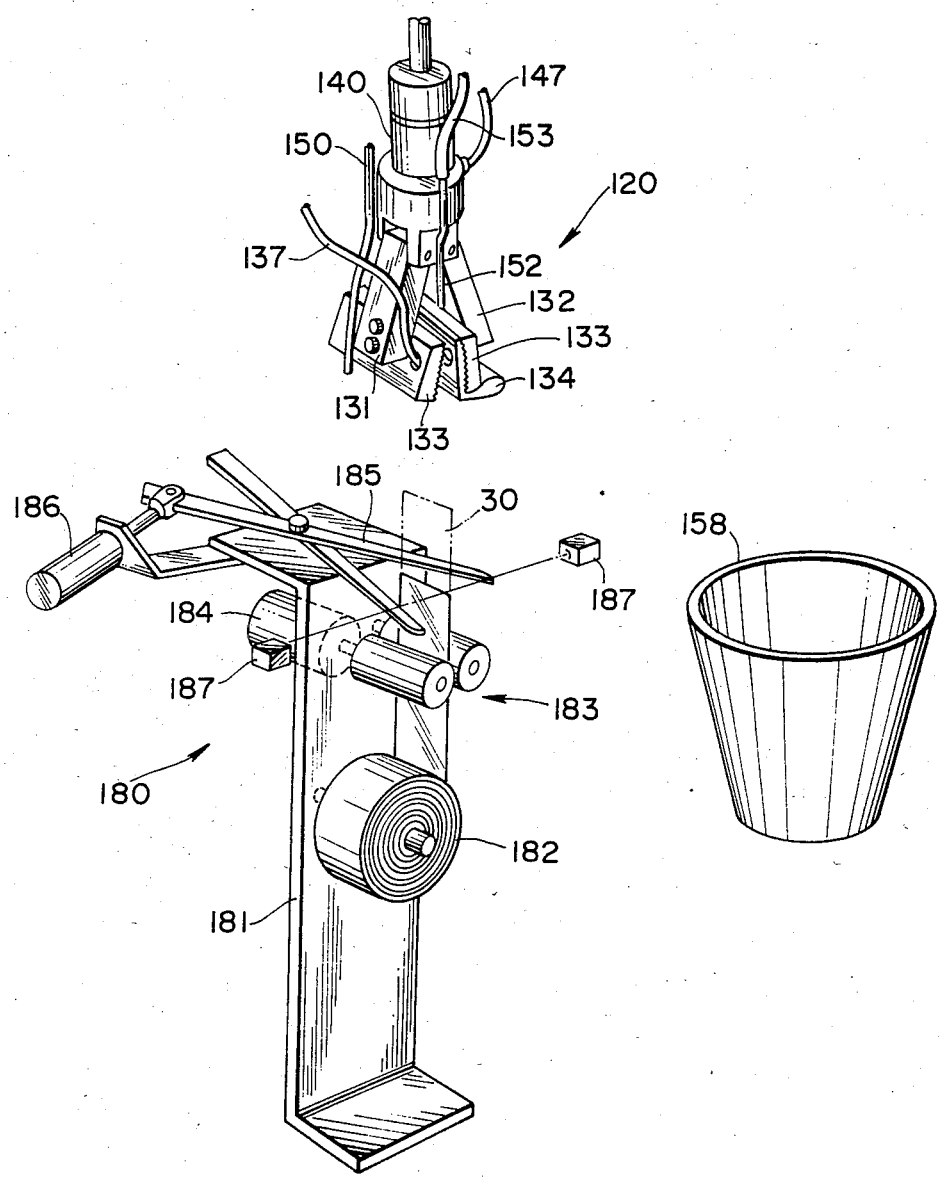
FIG. 7 is a perspective view showing a chip supply device with the hand assembly moving to a position where it receives a wiping chip from the chip supply device.

The pneumatic actuator 140 is connected to the manipulator arm hand portion 112 through a pneumatic cylinder 160 which is provided at its upper end with a flange 163 secured by bolts 162 to a flange 113 formed at the free end of the manipulator arm hand portion 112. The pneumatic cylinder 160 has a piston rod 165 which is threadedly secured at 166 to the pneumatic actuator 140. The pneumatic cylinder 160 serves to maintain the wiping chip 30 in resilient contact with the window glass plate 1. As shown in FIGS. 5 and 6, the solenoid valve 170 moves between two positions on command from the control system. The first position, illustrated in FIG. 5, results in the solenoid valve 170 providing connection between the air pressure source 155 and the actuator lower chamber 145 and interrupting connection between the actuator lower chamber 145 and the air nozzle 152. This causes the grasping fingers 131 and 132 to move to the closed position at which they hold a wiping chip. The second position, illustrated in FIG. 6, is encountered at the end of one or a predetermined number of glass wiping cycles and the solenoid valve 170 interrupts connection between the air pressure source 155 and the actuator lower chamber 145 and at the same time establishes connection between the actuator lower chamber 145 and the air nozzle 152. As a result, the return spring 148 pushes the plunger 142 down to open the grasping fingers 131 and 132 and also to inject air through the air nozzle 152 so as to blow out the wiping chip 30 into a vessel 158 (FIG. 7). It is to be understood that the air nozzle 152 may be connected to a separate pressure source through a solenoid valve which is operable to provide communication between the air nozzle and the air pressure source upon completion of one cycle of panel wiping operation.

Referring to FIG. 7, the wiping chip supply device 180 comprises a base member 181 on which a roll of cotton material 182 is supported together with all of components including feed rollers 183, a drive motor 184, a cutter 185, a pneumatic cylinder 186, and a photoelectric switch 187 necessary to supply a predetermined length of cotton wiping chip into the space between the grasping fingers 131 and 132. The drive motor 184 drives the feed rollers 183 to feed the cotton material upwards from the supply roll 182 and the pneumatic cylinder 186 actuates the cutter 185 to automatically cut the cotton material at a predetermined length. The photoelectric switch 187, which is positioned above the feed rollers 183, detects the cotton material fed to a predetermined length and energizes the pneumatic cylinder 186 to cut the cotton material at the predetermined length.

It is to be specifically understood that the cutter 185 and the pneumatic cylinder 196 may be eliminated from the chip supply device by feeding wiping chips from a stack of a predetermined length of cottom material chips rather than the roll of cotton material or by providing perforated lines on the cotton material at predetermined lengths so that the cotton material can easily be separated when gripped and pulled by the grasping fingers. In addition, it is to be understood that any other material may be substituted for the cotton material as long as it has high water absorption and low napping properties.

The operation of the glass wiping manipulator apparatus of this invention will now be described. First of all, the manipulator arm 110 carries the hand assembly 20 to a position just above the feed rollers 183 of the chip supply device 180 as programmed during the teaching operation. Upon arrival of the hand assembly 120 at this position, an "arrival" signal is applied to the control system which thereby energizes the drive motor 184, causing the feed rollers 183 to feed the cotton material upward from the supply roll 182 toward the grasping fingers 131 and 132. When a predetermined length of the cotton material passes the photoelectric switch 187, the control system stops the drive motor 184 from driving the feed rollers 183 and at the same time moves the solenoid valve 170 to the first position providing communication between the air pressure source 155 and the actuator lower chamber 145. As a result, the plunger 142 retracts against the force of the return spring 148 to cause the grasping fingers 131 and 132 to close and hold the cotton material therebetween. Under this condition, the cotton material interrupts light to the optical fiber 137, causing the control system to energize the pneumatic cylinder 186 so that the cutter 185 cuts the cotton material into a cotton material chip 30 of a predetermined length.

Sequentially, the manipulator arm 110 carries the hand assembly 120 with the grasping fingers 131 and 132 holding the cotton chip therebetween to a position as programmed during the teaching operation. This position is just above the periphery of the window glass panel 1 which has been set at a predetermined position by the lifter 12. Following this, the manipulator arm 110 carries the hand assembly 120 downward so that the cotton chip comes into contact with the periphery of the window glass panel 1. This condition causes the control system to start the detergent delivery pump supplying the detergent at a predetermined rate from the detergent tank 105 through the detergent conduit 150 and to start the manipulator arm 110 moving along the periphery of the window glass panel 1 as programmed during the teaching operation. The cotton chip is held in resilient contact with the window glass plate 1 by the function of the pneumatic cylinder 160 and spring 148 to ensure that it can follow the uneven surface profile of the window glass panel 1. During the glass wiping operation, the detergent such as ethyl acetate is continuously supplied in the form of tiny droplets from the detergent conduit outlet opening onto the window glass plate 1 just in advance of the cotton chip so that the cotton chip can wipe away stains and grease therefrom.

When the manipulator arm 110 carries the hand assembly 120 one round along the periphery of the window glass plate 1, an "end" signal is applied to the control system which thereby stops the detergent delivery pump from supplying the detergent and at the same time moves the manipulator arm 110 upward to bring the cotton chip 30 away from the window glass plate 1. Following this, the control system moves the manipulator arm 110 to a position just above the vessel 158, as programmed during the teaching operation. Upon arrival of the manipulator arm at this position, an "arrival" signal is applied to the control system which thereby moves the solenoid valve 170 to the second position interrupting communication between the air pressure source 155 and the actuator lower chamber 145 while at the same time providing communication between the actuator lower chamber 145 and the air nozzle 152. As a result, the plunger 142 moves downward by the force of the return spring 148 to open the grasping fingers 131 and 132 and to discharge the air charged in the actuator lower chamber 145 through the air nozzle 152 toward the cotton chip, thereby blowing off the cotton chip into the vessel 158. Following this, the control system starts the sequential cycle of wiping operation of the manipulator apparatus.

During one cycle of wiping operation of the manipulator apparatus, the lifter 12 continually lifts the window glass plate 1 off the conveyor 10, whereas the conveyor 10 moves rearward by a predetermined distance l to a position where the following window glass plate is transferred onto the conveyor 10. Upon completion of the wiping operation cycle, the lifter 12 lowers and puts the wiped window glass plate 1 onto the conveyor 10. Thereafter, the conveyor 10 moves forward by the predetermined distance l so that the following window glass plate arrives at the glass wiping station 100 and the wiped window glass plate arrives at the primer coating station 200.

Figure 8:
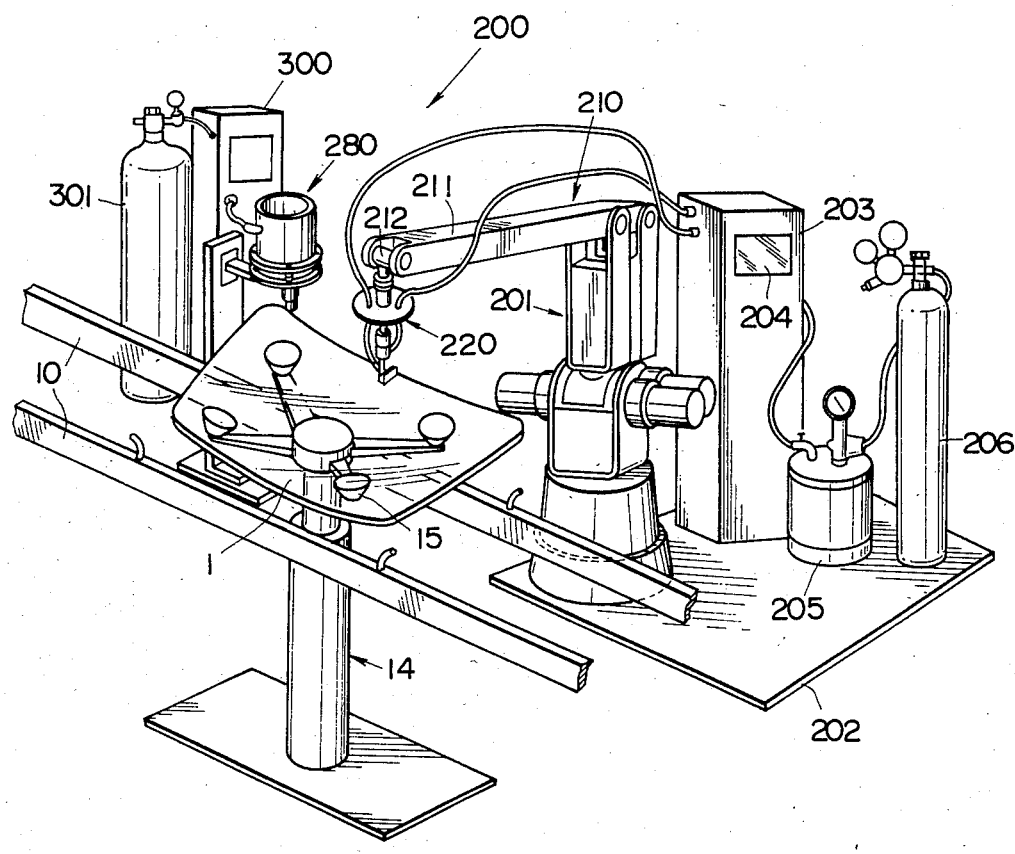
FIG. 8 is a schematic perspective view showing the primer coating station.

Referring to FIG. 8, there is illustrated a programmed manipulator apparatus 201 located near the lifter 14 at the primer coating station 200. The manipulator apparatus comprises a generally rectangular base or mounting platfrom 202 on which the hydraulically powered manipulator arm 210 of the apparatus is supported together with the hydraulic, pneumatic, electrical and electronic components necessary to perform repetitive cycles of primer coating operation of the manipulator arm.

Specifically, the base 202 supports a control cabinet 203 within which is housed the electronic control system portion of the manipulator apparatus. The cabinet has a control panel 204 on which are located the various controls of the control system necessary to control movement of the hydraulically powered manipulator arm in both an initial teaching mode and in a repeat mode in which the manipulator arm is moved in repetitive cycles through a sequence of movements as programmed during the teaching operation. The base 202 also supports a primer tank 205 and an inert gas bomb 206 connected to the primer tank 205 for isolating the primer from the atmosphere. A primer delivery pump (not shown) is housed in the control cabinet for supplying the primer at a predetermined rate from the primer tank 205. The reference numeral 280 designates an anti-caking device located near the manipulator apparatus 201. The anti-caking device 280 is connected through a control unit 300 to a gas bomb 301 which contains an anti-caking gas such as nitrogen, carbon dioxide, or any other suitable inert gas.

The hydraulically powered manipulator arm 210 comprises a boom assembly 211 mounted for movement about a plurality of axes relative to the base 202. The boom assembly carries a downwardly projecting hand portion 212 to which is connected a pneumatically operated hand assembly 220 adapted to grasp a coating brush.

Figure 9:
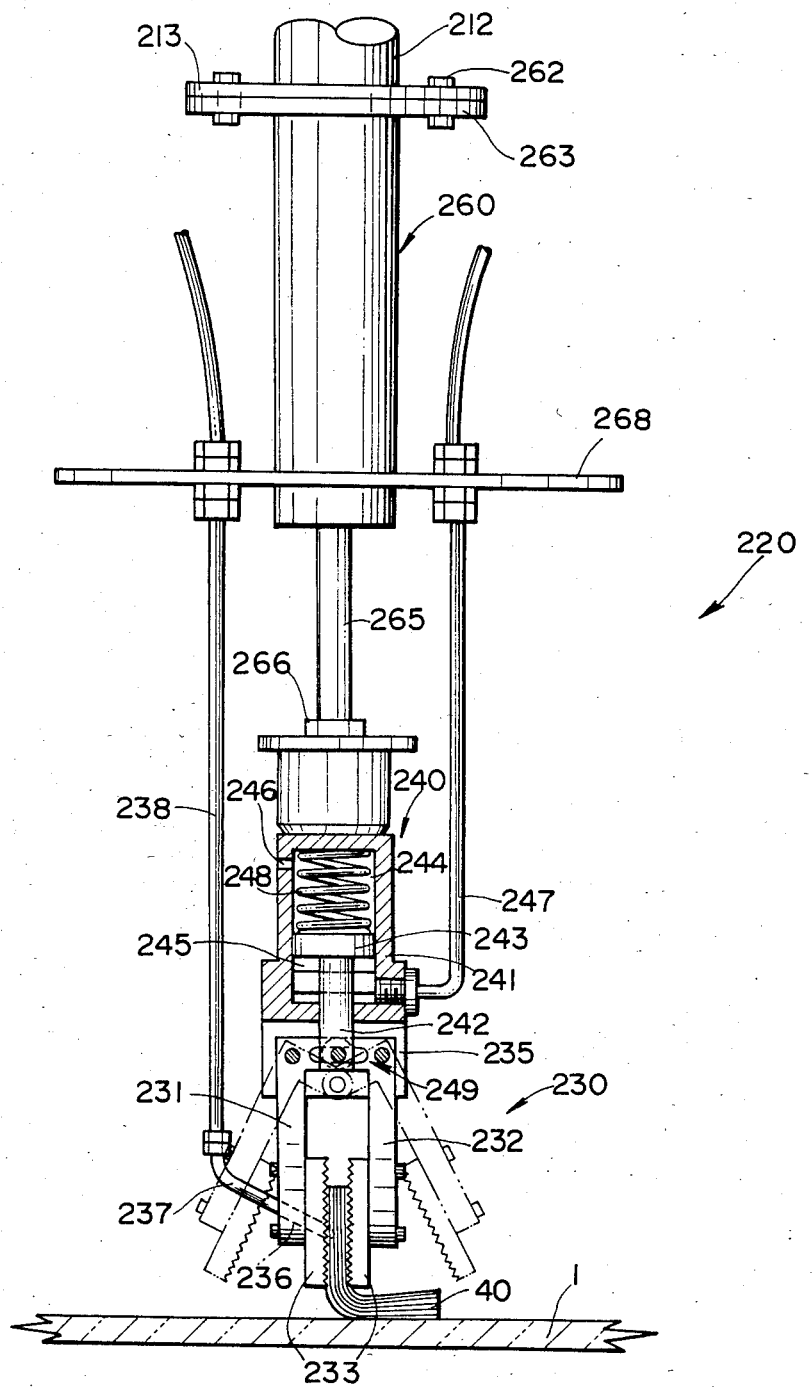
FIG. 9 is an enlarged elevation partly in section showing the detail of the hand assembly of FIG. 8.

Referring to FIG. 9, the pneumatically operated hand assembly 220 is shown in detail as comprising a clamping device 230 which has opposed grasping fingers 231 and 232 arranged to support a coating brush 40 therebetween. Each of the grasping fingers 131 and 132 has on its inner surface an antiskid member 233 bolted thereto which member 233 is formed on its inner surface with a nonskid pattern such as grooves to provide a large resistance to prevent the coating brush from slipping out. From the standpoints of durability and evenness of the edge of an area coated with primer, it is desirable to make the coating brush out of acrylic pile-cut carpet or the like. The grasping fingers 231 and 232 are mounted on a support member 235 for pivotal movement between an open position indicated by phantom lines and a closed position indicated by solid lines.

A hole 236 is formed obliquely through the grasping finger 231 and the antiskid member 233. A primer nozzle 237 extends through the oblique hole 236 into the coating brush 40. The primer nozzle 237 is connected through a primer conduit 238 to the primer tank 205 which contains a primer such, for example, as a mixture of ethyl acetate, carbon black, and a resin well-fitting to the adhesive to be coated thereon. When coated on the periphery of the window glass panel, the primer masks the coated area. The resistance of the primer coating against ultraviolet rays may be increased by adding a weather-proof agent in the mixture. The primer delivery pump housed in the control cabinet 203 supplies the primer at a predetermined rate, for example, 10 cc/min. from the primer tank 205 to the primer nozzle 237. An inert gas such as nitrogen, carbon dioxide or the like is charged from the inert gas bomb 206 into the primer tank 205 to isolate the primer from the atmosphere so as to prevent the primer from caking on the coating brush surface.

The hand assembly 220 also comprises a pneumatically operated actuator generally designated at 240. The actuator 240 includes a cylinder 241 and a plunger 242. The plunger has a head 243 which is adapted to reciprocate within the bore of the cylinder 241. The plunger head 243 divides the cylinder bore into upper and lower chambers 244 and 245, with the upper chamber 244 opening to the atmosphere through a vent 246. The lower chamber 245 is connected through an air supply conduit 247 to an air pressure source (not shown) housed in the control cabinet 203. The air pressure source is connected or disconnected from the lower chamber 245 by a solenoid valve (not shown) housed in the control cabinet on command from the control system. A return spring 248 is placed in the upper chamber 244 to resiliently urge the plunger 242 downward. The plunger 242 is drivingly connected through a link mechanism 249 to the grasping fingers 231 and 232 so that the extension and retraction movement of the plunger 242 causes the grasping fingers to open and close. When the pressure in the lower chamber 245 overcomes the resilient force of the return spring 248, the plunger 242 moves upward, in the drawing, to move the grasping fingers 231 and 232 to the closed position, as indicated by solid lines. The support member 235 is shown as secured on the lower surface of the actuator cylinder 241.

The pneumatic actuator 240 is connected to the manipulator arm hand portion 212 through a pneumatic cylinder 260 which is provided at its upper end with a flange 263 secured by bolts 262 to a flange 213 formed at the free end of the manipulator arm hand portion 212. The pneumatic cylinder 260 has a piston rod 265 which is threadedly secured at 266 to the pneumatic actuator 240. The pneumatic cylinder 260 serves to maintain the coating brush 40 in resilient contact with the window glass panel 1. The pneumatic cylinder 260 has a disc-shaped cover 268 mounted thereon. The cover 268 supports primer and air conduits 238 and 247 which extend through the cover 268.

Figure 10:
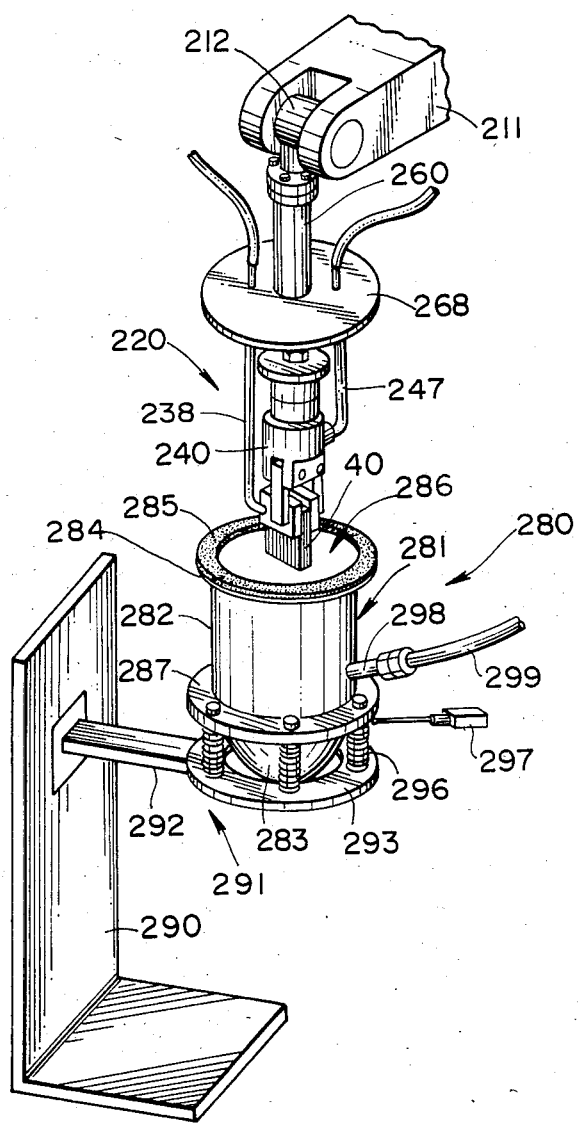
FIG. 10 is a perspective view showing an anti-caking device with the hand assembly moving to a position just above the anti-caking device.
Figure 11:
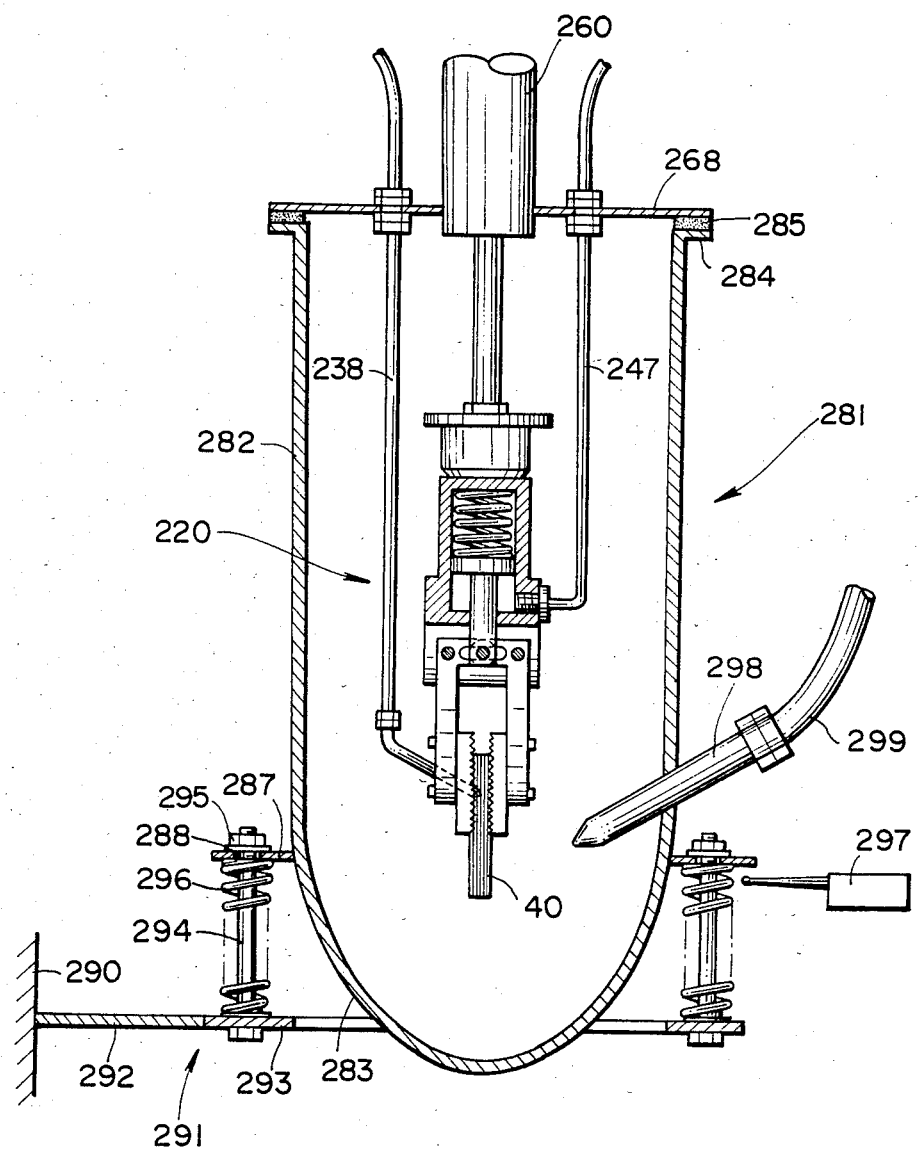
FIG. 11 is a sectional view of the anti-caking device with the hand assembly resting in the vessel.

Referring to FIGS. 10 and 11, the anti-caking device 280 comprises a projectile-shaped vessel 281 having a cylindrical portion 282 and a downwardly tapered portion 283. The cylindrical portion 282 is integrated at its upper end with a ring 284 on which a packing member 285 is bonded to ensure that the cover 268 can tightly close the vessel opening 286 when placed on the packing member 285. A ring-shaped flange 287 is secured on the outer peripheral of the vessel 281 near the connection of the cylindrical and tapered portions. The ring-shaped flange 287 is formed with a plurality of holes 288 spaced at equal angular distances.

The anti-caking device 280 also comprises a base 290 having a support member 291 with an arm portion 292 extending transversely from the base 290 and terminating in a ring portion 293. The ring portion 293 has secured thereon bolts 294 arranged at equal angular distances. Each of the bolts 294 extends through the corresponding one of the holes 288 and has at its upper end a screw 295 threadably engaged therewith. A coil spring 296 is placed around each bolt 294 and is seated between the flange 287 and the ring portion 293 to resiliently support the vessel 281 so that the vessel 281 can move in vertical and horizontal directions relative to the support member 292. A limit switch 297 is positioned just below the ring-shaped flange 287, the switch being turned on to generate an "on" signal by the downward movement of the vessel 281.

The reference numeral 298 designates a gas nozzle which extends into the interior of the vessel 281 for injecting an anti-caking gas toward the coating brush 40 when the hand assembly 220 is placed in the vessel 281 with the cover 268 closing the vessel opening 286. The gas nozzle 298 is connected to a gas conduit 299 which in turn is connected through the gas supply unit 300 to the gas bomb 301. The gas bomb 301 may contain nitrogen, carbon dioxide, or any other inert gas suitable as an anti-caking gas. The gas supply unit 300 supplies the anti-caking gas at a predetermined rate through the gas conduit 299 to the gas nozzle 298 for a predetermined period of time in response to the generation of an "on" signal from the limit switch 297.

The operation of the primer coating manipulator apparatus of this invention will now be described. First of all, the manipulator arm 210 carries the hand assembly 220 to a position just above the periphery of the window glass plate 1 as programmed during the teaching operation. Following this, the manipulator arm 210 carries the hand assembly 220 downward so that the coating brush 40 comes into contact with the periphery of the window glass panel 1. This condition causes the control system to start the primer delivery pump supplying the primer at a predetermined rate from the primer tank 205 through the primer conduit 238 to the primer nozzle 237 and to start the manipulator arm 210 moving along the periphery of the window glass panel 1 as programmed during the teaching operation. The coating brush 40 is held in resilient contact with the window glass panel 1 by the function of the pneumatic cylinder 260 to ensure that it can follow the uneven surface profile of the window glass panel 1. This is effective to maintain constant the area of the window glass panel surface contacting with the coating brush 40 so that the primer can be coated to form a layer of uniform width and uniform thickness on the periphery of the window glass panel 1 without degrading the evenness or the edge of the formed primer layer. During the primer coating operation, the primer is continuously impregnated at a predetermined rate into the coating brush without clogging at the primer nozzle 237 since the primer delivery pump discharges the primer at a predetermined rate.

When the manipulator arm 210 carries the hand assembly 220 one round along the periphery of the window glass panel 1, an "end" signal is applied to the control system which thereby stops the primer delivery pump from supplying the primer and at the same time moves the manipulator arm 210 upward to bring the coating brush 40 away from the window glass panel 1 as programmed during the teaching operation. Following this, the control system moves the manipulator arm 210 to a position just above the anti-caking vessel 281, as shown in FIG. 10, and then moves the manipulator arm 210 downward so that the coating brush 40 enters the vessel 281, as programmed during the teaching operation. When the manipulator arm 210 further moves downward from the position shown in FIG. 11 where the cover 268 rests on the packing member 285 to close the vessel 281, the flange 287 turns the limit switch 297 on to generate an "on" signal to the control system which thereby stops the downward movement of the manipulator arm 210 while at the same time causes the gas supply unit 300 to supply nitrogen gas to the gas nozzle 298. The nitrogen gas injected through the gas nozzle 298 toward the coating brush 40 creates an atmosphere of nitrogen within the interior of the vessel so as to prevent the primer from evaporating and caking on the coating brush surface. The manipulator arm 210 waits at this position for the sequential cycle of primer coating operation.

When it is required to replace the coating brush 40 after a selected operation period, pressurized air is interrupted from the air pressure source into the actuator lower chamber 245, to move the plunger 243 downward by the force of the return spring 248, causing the grasping fingers 231 and 232 to open. After a new coating brush is located between the grasping fingers 231 and 232, the communication between the air pressure source and the actuator lower chamber 245 is restored. As a result, the plunger 243 moves upward due to the force of the air pressure, causing the grasping fingers 231 and 232 to close and grasp the new coating brush.

Although in the exemplification of the invention, the limit switch 297 is located below the ring-shaped flange 287 circumscribing the vessel 281, it will be appreciated that the location of the limit switch relative to the vessel 281 can be suitably varied. In addition, the limit switch 297 may be removed and replaced with a suitable sensor such as a photo-electric switch or the like capable of detecting the cover 268 closing the vessel 281.

Although an inert gas such as nitrogen and carbon dioxide is used as an anti-caking agent creating an atmosphere of an inert gas within the interior of the vessel 281 to prevent the primer from caking on the coating brush surface, it will be appreciated that ethyl acetate or any other suitable solvent for the primer may be injected toward the coating brush 40. If the time during which the manipulator arm waits for the sequential cycle of primer coating operation at the position shown in FIG. 11 is so short that caking of the primer on the coating brush surface can be avoided simply by closing the vessel 281 with the cover 268, the anti-caking agent supply assembly including the gas nozzle 298, the gas conduit 299, the gas supply unit 300 and the gas bomb 302 may be eliminated.

Upon completion of the primer coating operation cycle, the lifter 14 lowers and puts the primer-coated window glass panel 1 onto the conveyor 10. Thereby, the conveyor 10 moves forward by the predetermined distance 1 so that the following window glass panel arrives at the primer coating station 200 and the primer-coated window glass panel arrives at the following adhesive coating station (not shown).

Although the present invention has been described in connection with automobile window glass panels, it is to be understood that the invention is equally applicable to process other panels such as steel panels, plastic panels. Although the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A method of performing repetitive cycles of panel coating operation using a programmable manipulator including a manipulator arm movable along a plurality of axes, said manipulator arm carrying thereon a hand unit holding a coating brush, comprising the steps of:
   (a) moving said manipulator arm by means of a program into a position where said coating brush comes into resilient contact with an area of said panel to be coated;
   (b) injecting coating material into said brush at a predetermined rate;
   (c) holding said brush in resilient, sliding contact with said panel, while moving said manipulator arm by means of said program about said panel to coat a preselected area of said panel; and
   (d) moving said manipulator arm by means of said program to move said brush out of contact with said panel when said preselected area is coated.

2. The method of claim 1, which further comprises the step of preventing the coating material from caking on the surface of the coating brush after completion of one cycle of panel coating operation.

3. The method of claim 2, wherein the anti-caking step includes the steps of; placing the coating brush into a vessel; closing the vessel; and applying an anti-caking agent to the coating brush placed in said vessel.

4. The method of claim 3, wherein said agent applying step is performed by charging an inert gas into said vessel.

5. The method of claim 3, wherein said agent applying step is performed by injecting a solvent for the coating material toward the coating brush.

6. An apparatus for perfoming repetitive cycles of panel coating operation using a programmable manipulator including a manipulator arm movable along a plurality of axes and control means for controlling movement of said manipulator arm as programmed during an initial teaching operation, comprising:
   (a) a hand unit carried on said manipulator arm for movement in unison therewith, said hand unit holding a coating brush;
   (b) said control means including means for controlling movement of said manipulator arm to slide the coating brush on an area of a panel which requires coating; and
   (c) a coating supplier for supplying a coating material at a predetermined rate to the coating brush during the sliding movement of the coating brush on the panel.

7. The apparatus of claim 6, which further comprises an anti-caking device for preventing the coating material from caking on the surface of the coating brush after completion of one cyle of panel coating operation.

8. The apparatus of claim 7, wherein said anti-caking device comprises a vessel for reception of the coating brush, and a cover for closing said vessel upon reception of the coating brush within said vessel.

9. The apparatus of claim 8, wherein said anti-caking device further comrises a sensor for detecting said cover closing said vessel, and means for applying an anti-caking agent to the coating brush during the reception of the coating brush within said vessel.

10. The apparatus of claim 9, wherein said agent applying means including means for charging an inert gas into said vessel.

11. The apparatus of claim 9, wherein said agent applying means including means for injecting a solvent for the coating material toward the coating brush.

12. The apparatus of claim 6, wherein said hand unit is movable between a brush retain position and a brush release position.

13. The apparatus of claim 12, which further comprises means for moving said hand unit to the brush release position when replacement of the coating brush is required.

14. The apparatus of claim 6, wherein said hand unit comprises a pair of opposed grasping fingers arranged to hold the coating brush therebetween, said grasping fingers being movable between an open position and a closed position.

15. The apparatus of claim 14, wherein said hand unit comprises support means connected between said grasping fingers and said manipulator arm for maintaining the coating brush in resilient contact with the panel during the sliding movement of the coating brush on the panel.

16. The apparatus of claim 14, which further comprises means for moving said grasping fingers to the open position when replacement of the coating brush is required.

* * * * *